United States Patent
Godey et al.

(10) Patent No.: US 11,861,781 B2
(45) Date of Patent: Jan. 2, 2024

(54) GRAPHICS PROCESSING UNITS WITH POWER MANAGEMENT AND LATENCY REDUCTION

(71) Applicants: ADVANCED MICRO DEVICES, INC., Santa Clara, CA (US); ATI TECHNOLOGIES ULC, Markham (CA); SAMSUNG ELECTRONICS CO., LTD., Suwon-si (KR)

(72) Inventors: Sreekanth Godey, Santa Clara, CA (US); Ashkan Hosseinzadeh Namin, Markham (CA); Seunghun Jin, Suwon-Si (KR); Teik-Chung Tan, Suwon-si (KR)

(73) Assignees: SAMSUNG ELECTRONICS CO., LTD., Suwon-si (KR); Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 247 days.

(21) Appl. No.: 17/134,744

(22) Filed: Dec. 28, 2020

(65) Prior Publication Data
US 2022/0207813 A1 Jun. 30, 2022

(51) Int. Cl.
*G06F 1/3228* (2019.01)
*G06T 15/00* (2011.01)
*G06F 1/3212* (2019.01)
*G06F 9/50* (2006.01)
(Continued)

(52) U.S. Cl.
CPC .......... *G06T 15/005* (2013.01); *G06F 1/3212* (2013.01); *G06F 1/3215* (2013.01); *G06F 1/3228* (2013.01); *G06F 9/30098* (2013.01); *G06F 9/5011* (2013.01)

(58) Field of Classification Search
CPC .... G06F 1/3243; G06F 1/3287; G06F 1/3206; G06F 1/3296; G06F 1/3203; G06F 1/3212; G06F 1/3215; G06F 1/3228; G06F 1/3234; G06F 9/30098; G06F 9/4418; G06F 9/5011; G06T 15/005
See application file for complete search history.

(56) References Cited

U.S. PATENT DOCUMENTS 6,657,634 B1 12/2003 Sinclair et al.
7,664,970 B2 2/2010 Jahagirdar et al.
8,966,305 B2 2/2015 Branover et al.
(Continued)

*Primary Examiner* — Hau H Nguyen

(57) ABSTRACT

The graphics processing unit (GPU) of a processing system transitions to a low-power state between frame rendering operations according to an inter-frame power off process, where GPU state information is stored on retention hardware. The retention hardware can include retention random access memory (RAM) or retention flip-flops. The retention hardware is operable in an active mode and a retention mode, where read/write operations are enabled at the retention hardware in the active mode and disabled in the retention mode, but data stored on the retention hardware is still retained in the retention mode. The retention hardware is placed in the retention state between frame rendering operations. The GPU transitions from its low-power state to its active state upon receiving an indication that a new frame is ready to be rendered and is restored using the GPU state information stored at the retention hardware.

21 Claims, 4 Drawing Sheets

(51) Int. Cl.
   *G06F 1/3215*   (2019.01)
   *G06F 9/30*     (2018.01)

(56) References Cited

U.S. PATENT DOCUMENTS

| | | | |
|---|---|---|---|
| 9,250,665 B2 | 2/2016 | Avkarogullari et al. | |
| 10,043,235 B2 | 8/2018 | Kim et al. | |
| 10,199,014 B2* | 2/2019 | Kwa | G09G 5/399 |
| 2013/0070515 A1* | 3/2013 | Mayhew | G11C 5/005 |
| | | | 365/148 |
| 2017/0301395 A1* | 10/2017 | Clark | G11C 7/02 |
| 2019/0163254 A1* | 5/2019 | Dewey | G06F 1/3243 |

* cited by examiner

GRAPHICS PROCESSING UNITS WITH POWER MANAGEMENT AND LATENCY REDUCTION

BACKGROUND

Mobile graphics processing units (GPUs) typically have power requirements that diverge significantly from other conventional GPUs. For example, power conservation is an important component in extending battery life of a mobile device that includes a mobile GPU. However, existing mobile GPUs tend to consume significant amounts of power, compared to the overall power consumption of a device. Some mobile devices reduce overall power consumption by implementing a power management scheme that periodically places the mobile GPU into a low-power state. However, typical power management schemes introduce relatively high latencies in mobile GPU performance, which limits the efficiency and efficacy of such power management schemes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
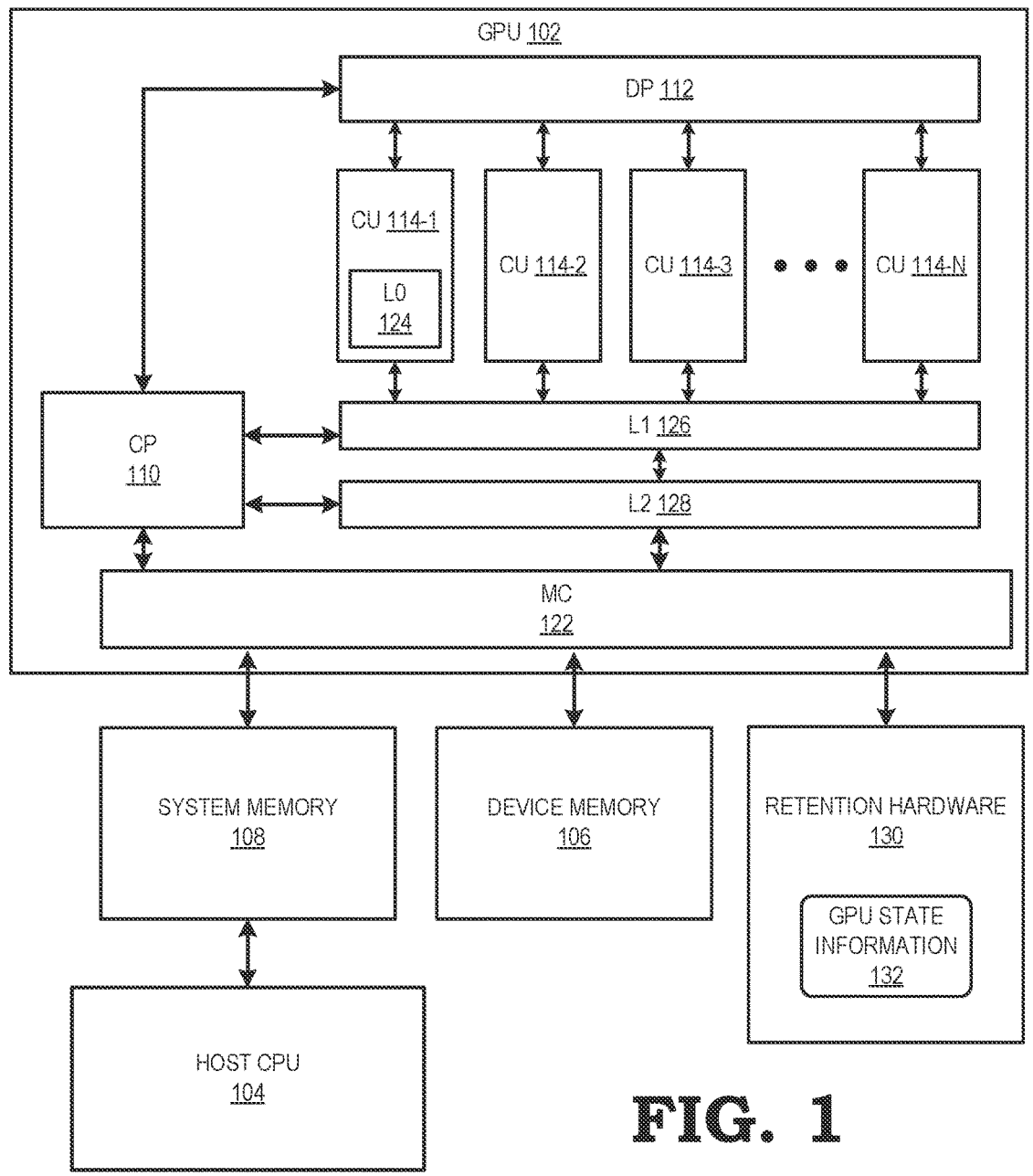
FIG. 1 is a block diagram of a processing system that includes a graphics processing unit (GPU) configured to execute an inter-frame power off (IFPO) process while storing GPU state information in retention hardware, in accordance with some embodiments.

Embodiments of the present disclosure relate to graphics processing units (GPUs) configured to transition from an active state a low-power state between frame rendering operations to save power. While in the low-power state, GPU state information is stored in retention hardware such as retention random-access memories (RAMs) or retention flip-flops. A small amount of power is applied to the retention hardware, sufficient to allow the retention hardware to retain the data stored thereon while the GPU is in the low-power state. By using such retention hardware for the storage and restoration of GPU state information while the GPU is in the low-power state between rendering of frames, the GPU can transition between its low-power state and its active state relatively quickly, thereby reducing overall latency at the GPU and improving device performance.

To further illustrate, a conventional GPU typically remains in an active (or "on") state throughout the time period in which image frame rendering is performed and, consequently, consumes a relatively high amount of power throughout this time period. An electronic device incorporating the GPU (e.g., a mobile phone) implements a power management scheme, wherein the GPU is configured to transition into a low-power state and remain in the low-power state during the time period between rendering consecutive image frames (sometimes referred to herein more simply as "frames"). In some embodiments, the GPU transitions to the low-power state upon completion of rendering a first frame and transitions back into the active state (sometimes referred to herein as the GPU being "woken up"). The low-power state ends when the next consecutive frame is ready to be processed by the GPU. In some embodiments, a driver associated with the GPU queues up a graphics workload for the next consecutive frame and, in response, the GPU initiates its transition from the low-power state to the active state, where the driver internally maintains a timer to recognize frame boundaries. This method of transitioning the GPU to the low-power state between frames is referred to herein as Inter Frame Power Off (IFPO). In some embodiments, IFPO is used to achieve better sustained power usage (e.g., less power consumption, longer effective battery life, etc.) during regular usage, instances of which are sometimes referred to as Day-Of-Use (DOU) applications, of a mobile device such as a smartphone or tablet computing device.

Two aspects of IFPO that govern overall power reduction are the transition time from the active state to the low-power state (i.e., the low-power state transition time) and the transition time from the low-power state to the active state (i.e., the active state transition time) of the GPU. In some cases, restoring the GPU to its active state within the timing limitations of a frame is challenging. For example, frame times tend to be around 8.3 ms for a 120 Hz refresh rate. As another example, during the low-power state transition, various information (referred to herein as "GPU state information") regarding the state of the GPU and its constituent components is stored. For non-retention IFPO systems, the low-power state transition contributes about 610 μs for an 8.3 ms frame with 120 Hz refresh rate. It should be understood that any latencies described herein are intended to be illustrative and not limiting. In practice, system level latencies can be significantly higher than those described herein and are generally dependent on the particular implementation of the system. During the active state transition, the previously stored GPU state information is restored and the GPU components are initialized to process the next frame. For non-retention IFPO systems, the active state transition contributes about 520 μs of latency for an 8.3 ms frame with 120 Hz refresh rate. Thus, more than one-eighth of the frame time is taken up by non-retention IFPO low-power state transition and non-retention active state transition. The retention IFPO processes described herein desirably reduce these latencies by storing GPU state information on retention hardware that is kept in a retention state when the GPU is in its low-power state. By employing the retention hardware in this way, a portion of the system-level latencies typically encountered in non-retention IFPO processes are instead confined to the GPU in the retention IFPO processes described herein.

According to aspects of the present disclosure, some or all of the GPU state information is stored in retention hardware that is coupled to or included in the GPU in order to increase the speed with which the state information is stored and restored, and therefore increase the speed with which the GPU can transition between the active state and the low-power state and between the low-power state and the active state during the IFPO process. In some embodiments, the retention hardware is included as part of a system-on-a-chip (SoC) that includes the GPU. Alternatively, in some embodiments, the retention hardware is included on a die separate from that of the GPU. In some embodiments, the retention hardware includes one or more retention RAMs or retention flip-flops. In some embodiments, microcode and/or register settings of the GPU are stored in the retention hardware, as the IFPO steps of microcode loading and saving and restoring register settings typically tend to consume more time than other steps of the IFPO process. By saving and loading the microcode and register settings to and from retention hardware rather than having to perform direct memory accesses (DMAs) to save and load the microcode and register settings to and from dynamic RAM (DRAM) of the device memory 106, the latency associated with these operations is reduced (e.g., from milliseconds to microseconds), since such DMAs have comparatively high latency. Generally, by using an IFPO technique in combination with retention hardware, as described herein, the GPU achieves around 240 mW of static power consumption reduction compared to that achieved by non-IFPO techniques, and around 200 mW of static power consumption reduction compared to that achieved by non-retention IFPO techniques. In some embodiments the retention hardware requires additional substrate area compared to non-retention variants (e.g., non-retention RAM, non-retention flip-flops).

FIG. 1 illustrates a processing system 100 that includes a GPU 102 configured to perform improved IFPO operations that utilize retention memory hardware 130. The processing system 100 includes a GPU 102, a host CPU 104, a device memory 106 utilized by the GPU 102, and a system memory 108 shared by the GPU 102 and the host CPU 104. The memories 106, 108 include any of a variety of random access memories or combinations thereof, such as a double-data-rate dynamic random access memory (DDR DRAM), a graphics DDR DRAM (GDDR DRAM), and the like.

In the depicted embodiment, the GPU 102 includes a command processor (CP) 110, a dispatch processor (DP) 112, a plurality of compute units (CU) 114 (numbered 114-1, 114-2, 114-3, and 114-N), and a memory management subsystem that includes an a memory controller 122 for managing address translation operations for one or all of the memories 106 and 108 and the retention hardware 130. The memory management subsystem further includes a cache hierarchy including one or more levels of data and instruction caching, such as a private level 0 (L0) cache 124 at each compute unit 114, a shared level 1 (L1) cache 126, and a shared level 2 (L2) cache 128.

In some embodiments, the retention hardware 130 is separate from the system memory 108 and the device memory 106. In some embodiments, the retention hardware 130 is included as part of the device memory 106. For some embodiments in which the retention hardware 130 is separate from the device memory 106, the system memory 108 and the device memory 106 are both non-retention memories, meaning that they are operable in active and inactive states, but are not operable in a retention state in which they retain stored data without being capable of read/write functionality. For some embodiments in which the retention hardware is included in the device memory 106, a first subset of RAM of the device memory 106 is non-retention RAM and a second subset of RAM is retention RAM that is included in the retention hardware 130 and is operable in the retention state. In some embodiments, the retention hardware 130 is included as part of a system-on-a-chip (SoC) that includes the GPU 102. Alternatively, in some embodiments, the retention hardware 130 is included on a die separate from that of the GPU 102.

In some embodiments, the retention hardware 130 is dedicated for use by only the GPU 102, (i.e., it is not directly accessible by the host CPU 104). The retention hardware 130 includes one or more types of data storage devices operable in respective retention modes, such as retention RAM or retention flip-flops. For example, in some embodiments the retention hardware 130 employs a retention RAM that is configured to be operable in two or more modes, including a normal/active mode and a retention mode, sometimes referred to as a standby mode or a sleep mode. In the retention mode, the RAM is placed in a retention state in which the power supply voltages applied to the memory cells of an array of memory cells of the RAM are reduced to voltages below that necessary for access, but above the minimum power supply voltage required for each cell to retain its stored data state, which is sometimes referred to as its data-state retention voltage (DRV). In some embodiments, the retention RAM is powered using a secondary power supply voltage when in the retention state, which allows the data stored on the retention RAM to be retained throughout the time that the retention RAM is in the retention state and to subsequently be retrieved when the main power supply voltage is switched back on (e.g., upon initiating the IFPO active state transition for the GPU 102 for embodiments in which the retention hardware includes retention RAM). For example, to protect the data stored on the memory cells of a RAM, the RAM is biased, in the retention state, to a secondary power supply voltage that is above the DRV for the memory cell in the array of the retention RAM having the highest (e.g., worst) DRV. For example, the secondary power supply voltage allows the retention RAM to retain the data stored thereon, but is not high enough for read and write operations to be performed at the retention RAM. In some embodiments, the retention RAM is coupled to a single power supply voltage rail that is dynamically biased to the main power supply voltage when the retention RAM is in the normal/active state and biased to the secondary power supply voltage when the retention RAM is in the retention state.

Figure 2:
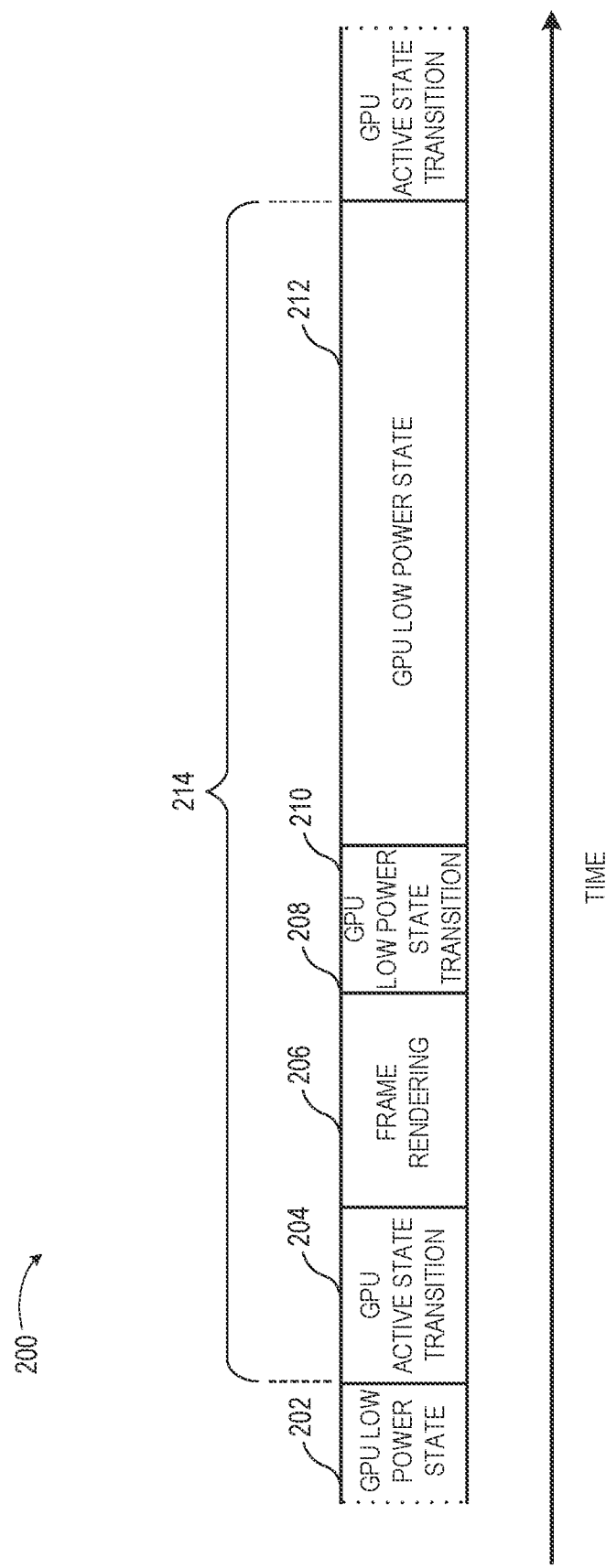
FIG. 2 is a timing diagram illustrating an IFPO process for the GPU of FIG. 1 in accordance with some embodiments.

In other embodiments, the retention hardware 130 includes one or more retention flip-flops, wherein each retention flip-flop is a volatile latch circuit that is configured to be operable in two or more modes including a normal/active mode and a retention mode, which is sometimes referred to as a standby mode or a sleep mode. All portions of the retention flip-flop receive power during normal/active modes, and the retention flip-flop functions substantially the same as a normal flip-flop to receive and temporarily store data bits during logic operations performed by its host circuit (e.g., the GPU 102). When the retention flip flop is instructed to switch from the normal/active mode into the retention mode, the retention flip-flop retains the last-received data bit value in way that facilitates switching off a main power supply voltage to selected portions of the retention flip-flop in order to conserve power during the retention mode, and that allows the last-received data bit value to be output by the retention flip-flop when the main power supply voltage is switched back on (e.g., upon initiating the IFPO active state transition for the GPU 102 for embodiments in which the retention hardware 130 includes retention flip-flops). Specifically, a portion of the retention flip-flop utilizes a secondary power supply voltage to remain active while the GPU 102 is in the powered-down state in order to retain the last-received data value while the main supply voltage is turned off, while other portions of the retention flip-flop are inactive, thereby facilitating both lower power consumption during standby/sleep modes, and also resumption of operations using last-received data values when normal operations are resumed. For example, the secondary power supply voltage allows the retention flip-flop to retain the data stored thereon, but is not high enough for read and write operations to be performed at the retention flip-flop As an illustrative example, during normal operation the GPU 102 is tasked by the host CPU 104 with rendering a set of frames to be displayed at a screen of the mobile device that includes the GPU 102. The GPU 102 acts in accordance with an IFPO procedure (e.g., as illustrated in FIG. 2), such that after rendering each frame of the set of frames, the GPU 102 transitions into a low-power state (i.e., sometimes referred to herein as the "IFPO low-power state transition") and, upon receiving a subsequent frame for rendering, the GPU 102 transitions back into an active state (sometimes referred to herein as the "IFPO active state transition"). During the IFPO low-power state transition, GPU state information 132, which defines various aspects of the current state of the GPU and its constituent components is stored on the retention hardware 130 According to various embodiments, the GPU state information 132 includes state information for one or more microcontrollers, pipelines, queues, state machines, GPU registers), program counters, and/or the like and, in some instances, includes data stored in the GPU registers and/or program counters. In some embodiments, the GPU registers for which data is included in the GPU state information 132 include configuration registers and/or control registers that store information for configuring or controlling the shaders, the first-in-first out (FIFO) buffers, the virtual memory, the L0, L1, and/or L2 caches, and/or other applicable components or aspects of the GPU 102. As an example, the GPU state information 132 stored at the retention hardware 130 includes microcode (i.e., hardware-level instructions that implement higher-level machine code instructions or internal state machine sequencing, which sometimes involves implementing logic such as scheduling logic) corresponding to one or more microcontrollers of the GPU (e.g., the command processor 110), GPU register settings (e.g., of one or more of the various types of configuration registers and/or control registers of the GPU described previously), addresses of the GPU registers, and/or other applicable data. In some embodiments, in the IFPO low-power state transition period, all components of the GPU are turned off, except for the retention hardware 130, which is held in its retention state via application of a secondary power supply voltage. Generally, the secondary power supply voltage is sufficient to ensure retention of the data stored on the retention hardware 130, but is less than the main power supply voltage required to write data to and read data from the retention hardware 130. The retention hardware 130 generally remains in its retention state for as long as the GPU 102 remains in the low-power state. Upon receipt of a subsequent frame for processing, the IFPO active state transition is triggered, in response to which the GPU 102 restores power to its constituent components and switches the power supplied to the retention hardware 130 from the secondary power supply voltage to the main power supply voltage. In some embodiments, the secondary power supply voltage supplied to the retention hardware 130 in its retention state is set to the minimum voltage required to retain the data stored in the retention hardware 130. In some embodiments, this minimum voltage is selected based on the DRV of the memory cell or flip-flop of the retention hardware 130 having the highest DRV. In some embodiments, the minimum voltage is directly set to the DRV of this memory cell or flip-flop.

Compared to a non-retention IFPO process, embodiments of the retention IFPO process provided herein reduce latencies associated with the low-power state transition and active state transition of the GPU 102 when entering and exiting the low-power state between rendering consecutive image frames. In some examples, given an 8.3 ms frame period, a non-retention IFPO process generally has a low-power state transition latency of about 610 μs due to GPU quiescence, Performance Monitoring Unit (PMU) hand-shaking, saving register settings to the speculative register map (SRM), saving microcode and the register settings to the DRAM after saving the register settings to the SRM, and ramping down the power rail. In some examples, given an 8.2 ms frame period, the active state transition latency of the non-retention IFPO process is about 520 μs due to power rail ramp up, run list controller (RLC) microcode loading, loading register settings from DRAM to the SRM, GPU restoration from SRM, and GPU initialization. In contrast, in some embodiments the retention IFPO process described herein has a low-power state transition latency of about 510 μs and an active state transition latency of about 400 μs since the retention hardware 130 obviates the need for the step of saving GPU state information to the DRAM (e.g., saving about 99 μs) during the low-power state transition and the steps of microcode loading and SRM loading from the DRAM (e.g., saving about 12 μs and about 110 μs, respectively), which translates to a total latency reduction of about 220 μs in such embodiments.

FIG. 2 shows a timing diagram 200 illustrating IFPO operations of a GPU, described here in the context of the processing system 100 of FIG. 1. In the present example, a frame period 214 is depicted, which spans a time period between the receipt of a first image frame for rendering by the GPU 102 and the receipt of a second image frame for rendering by the GPU 102. When rendering a sequence of image frames, the operations of the GPU performed during the frame period 214 are substantively repeated for each image frame of the sequence.

At time period 202, the GPU 102 is in a low-power state in which power is not supplied to most or all components of the GPU 102 (e.g., the command processor 110, the dispatch processor 112, the compute units 114, the caches L1 and L2, and the memory controller 122). In some embodiments, the GPU 102 is in the low-power state at the time period 202 due to the GPU 102 transitioning to the low-power state upon rendering a preceding frame.

During an active state transition time period 204, the GPU 102 executes an active state transition sequence to transition from the low-power state to the active state. In some embodiments, the active state transition sequence includes restoring power to the components of the GPU to which power was not supplied while the GPU 102 was in the low-power state, performing initialization processes at the GPU 102, and transitioning the retention hardware 130 from the retention state to the active state to make the GPU state information 132 stored thereon, if any, available for use by the GPU 102.

During an active time period 206, the GPU renders the first image frame. For example, the GPU receives instructions and raw image data (e.g., raw vertices and primitives) from the host CPU 104 and processes the raw image data (e.g., via shading, primitive setup, rasterization, tessellation, pixel processing, and/or the like) according to the instructions using the compute units 114 to render the first image frame.

Once the first image frame is rendered, the GPU 102 transitions into a low-power state during a low-power state transition time period 208. During the low-power state transition time period 208, the GPU 102 stores GPU state information 132 at the retention hardware 130 (e.g., as the GPU state information is generated). In some embodiments, the GPU state information 132 stored at the retention hardware 130 includes microcode, GPU register settings, and/or other applicable data. During the low-power state transition time period 208, the GPU 102 stops supplying power to most or all of its constituent components, and the retention hardware 130 transitions into a retention state in which power supplied to the retention hardware is decreased to a level that is sufficient for data retention at the retention hardware 130, but that is not sufficient for read/write operations to be performed at the retention hardware 130. In some embodiments, the retention hardware 130 is transitioned into the retention state by changing a power supply voltage supplied to the retention hardware 130 from a main power supply voltage (e.g., which provides sufficient power to the retention hardware 130 for read/write operations to be performed) to a secondary power supply voltage, where the second power supply voltage is lower than the main power supply voltage. In some embodiments, retention hardware 130 includes retention RAMs, and the second power supply voltage corresponds to the DRV of a memory cell of the plurality of retention RAMs having the highest DRV of all memory cells of the retention RAMs.

During time period 210, the GPU 102 remains in the low-power state in which power is not supplied to most or all components of the GPU, as indicated above, and the retention hardware 130 remains in the retention state and continues to store the GPU state information 132.

At the beginning of the next active state transition time period 212, the GPU 102 receives the next (second) image frame for rendering, which triggers the GPU 102 to perform its active state process and which marks the start of the next frame period. As during the time period 204, the GPU 102 restores power to its constituent components to transition back into the active state of the GPU and retrieves and restores the GPU state information 132 from the retention hardware 130 as part of the active state transition process. The retention hardware 130 transitions from the retention state to its active state during the active state transition time period 212, so that the GPU state information 132 can be retrieved by the GPU 102. In some embodiments, the retention hardware 130 transitions from the retention state to the active state by switching the power supply voltage supplied to the retention hardware 130 from the secondary power supply voltage to the main power supply voltage. The main power supply voltage and the secondary power supply voltage levels are generally dependent on the operational and hardware specifications of the processing system 100, but it should be understood that the secondary power supply voltage level is less than the main power supply voltage level.

Figure 3:
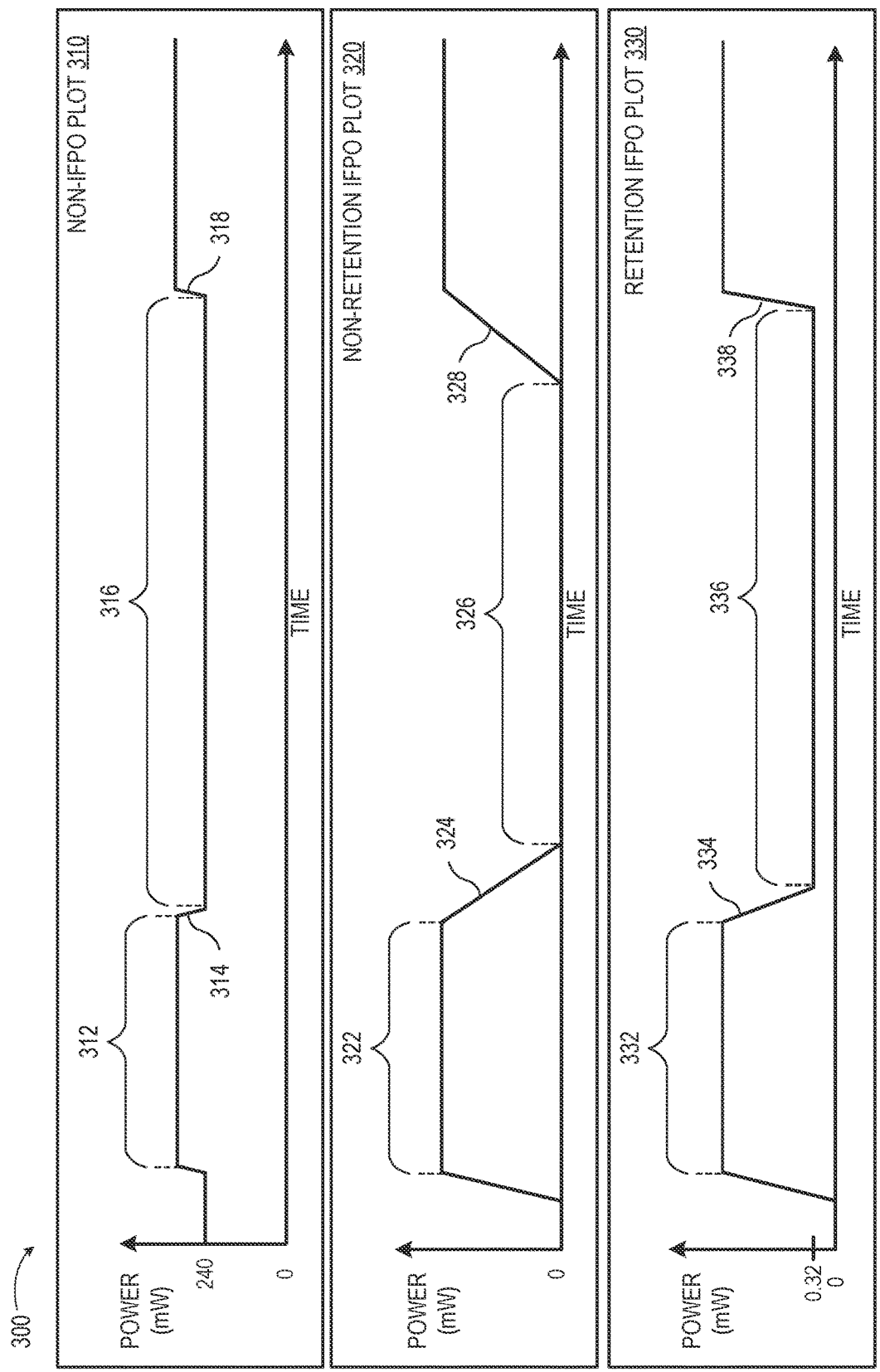
FIG. 3 is a chart illustrating relative power consumption over time for a GPU under different configurations, in accordance with some embodiments.

FIG. 3 shows a chart 300 illustrating instantaneous power consumption over time for a GPU is not configured for IFPO, a GPU that is configured for IFPO without retention hardware (i.e., "non-retention IFPO"), and a GPU that is configured for IFPO with retention hardware (i.e., "retention IFPO"). As shown the chart 300 includes plots 310, 320, and 330 that share a common time axis for the purpose of comparison, but that respectively correspond to different GPU configurations.

The non-IFPO plot 310 represents the instantaneous power consumption over time for a GPU that is not configured for IFPO. During an active time period 312, the GPU renders an image frame and has a relatively high instantaneous power consumption. During a time period 314 (i.e., spanning the end of the time period 312 to the beginning of the time period 316), the GPU transitions into an idle state in which its constituent components are still supplied with power, but are not actively rendering an image frame. The GPU remains in the idle state throughout an idle time period 316. During the idle state, the GPU continues to have an instantaneous power consumption of about 240 mW, for example. During a time period 318, the GPU transitions from the idle state back into the active state upon receiving the next image frame for rendering.

The non-retention IFPO plot 320 represents the instantaneous power consumption over time for a GPU that is configured for IFPO, but that does not include any retention hardware and instead utilizes non-retention DRAM of the device memory via DMA to store and retrieve GPU state information (e.g., microcode, register settings, and/or the like). During an active time period 322, the GPU renders an image frame and has a relatively high instantaneous power consumption. At a low-power state transition time period 324 (i.e., spanning the end of the time period 322 to the beginning of the time period 326), the GPU transitions into a non-retention low-power state in which components (e.g., compute units, microprocessors, caches, controllers, memory modules, and/or the like) of the GPU are no longer supplied with power. During the low-power state transition time period 324, the GPU stores GPU state information (e.g., register settings) for rendering the next frame in the DRAM of the device memory coupled to the GPU. In some examples, storing the GPU state information in the DRAM takes about 99 μs due to latencies associated with DRAM DMA. The GPU remains in the non-retention low-power state throughout a low-power state time period 326, so the power consumption of the GPU is substantially zero during the low-power state time period 326. During the low-power state, the GPU continues to supply no power to the components mentioned above. During an active state transition time period 328, the GPU transitions from the non-retention low-power state back into the active state upon receiving the next image frame for rendering. For example, during the active state transition time period 328, the GPU power rail is ramped up, microcode is loaded to the GPU by the RLC, the SRM of the GPU is loaded with GPU state information (e.g., register settings) from the DRAM that were stored there during the low-power state transition time period 324, the GPU is restored from the SRM, and the GPU is initialized.

The retention IFPO plot 330, represents the instantaneous power consumption over time for a GPU that is configured for IFPO and that includes retention hardware on which GPU state information is stored. The GPU represented in the plot 330 is described here in the context of the GPU 102 and the processing system 100 of FIG. 1. During an active time period 332, the GPU 102 renders an image frame and has a relatively high instantaneous power consumption. At a low-power state transition time period 334 (i.e., spanning the end of the time period 332 to the beginning of the time period 336), the GPU 102 transitions into a low-power state (i.e., "retention low-power state") in which components (e.g., compute units, microprocessors, caches, controllers, memory modules, and/or the like) of the GPU 102 are no longer supplied with power, so instantaneous power consumption decreases during the low-power state transition time period 334. During the low-power state transition time period 334, the GPU state information 132 (e.g., register settings and microcode) for the GPU 102 is stored at the retention hardware 130, so there is no need to add latency by storing the GPU state information 132 in DRAM, which, in some embodiments, reduces latency by about 99 us compared to the non-retention IFPO example of the plot 320.

Additionally, during the low-power state transition time period 334, the retention hardware 130 transitions from an active state to a retention state in which the power supply voltage supplied to the retention hardware 130 is changed from a higher main power supply voltage to a lower secondary power supply voltage. In some embodiments, the secondary power supply voltage is set to a maximum DRV among the DRVs of all memory cells of the retention hardware 130. The GPU 102 remains in the low-power state throughout a retention low-power state time period 336. During the retention low-power state, the GPU continues to supply no power to the components mentioned above, but some voltage leakage (e.g., contributing about 0.32 mW of power consumption in the present example) is expected to occur at the retention hardware 130 in its retention state. During an active state transition time period 338, the GPU 102 transitions from the retention low-power state back into the active state upon receiving the next image frame for rendering. For example, during the active state transition time period 338, the GPU power rail is ramped up, the retention hardware 130 transitions to its active state (e.g., by switching from receiving the secondary power supply voltage to receiving the main power supply voltage), the GPU 102 is restored from GPU state information 132 (e.g., register settings and microcode) stored at the retention hardware 130, and the GPU is initialized. Since the GPU 102 does not need to access the DRAM to retrieve the GPU state information 132, the latency attributable to the active state transition time period 338 is reduced (e.g., by about 120 μs in some embodiments).

As shown, the low-power state and active state transition times are significantly longer in the non-retention IFPO example of the plot 320 than in the retention IFPO example of the plot 330 described due to latencies associated with storing and retrieving GPU state information to/from DRAM during these transition time periods, which is are not performed in the retention IFPO example of the plot 330 due to the inclusion and utilization of the retention hardware 130. It should be noted that the roughly 0.32 mW power consumption attributable to the retention hardware 130 in the retention IFPO example of the plot 330 is significantly offset by the power consumption reduction achieved by the reduction in latency achieved over the non-retention IFPO example of the plot 320.

Figure 4:
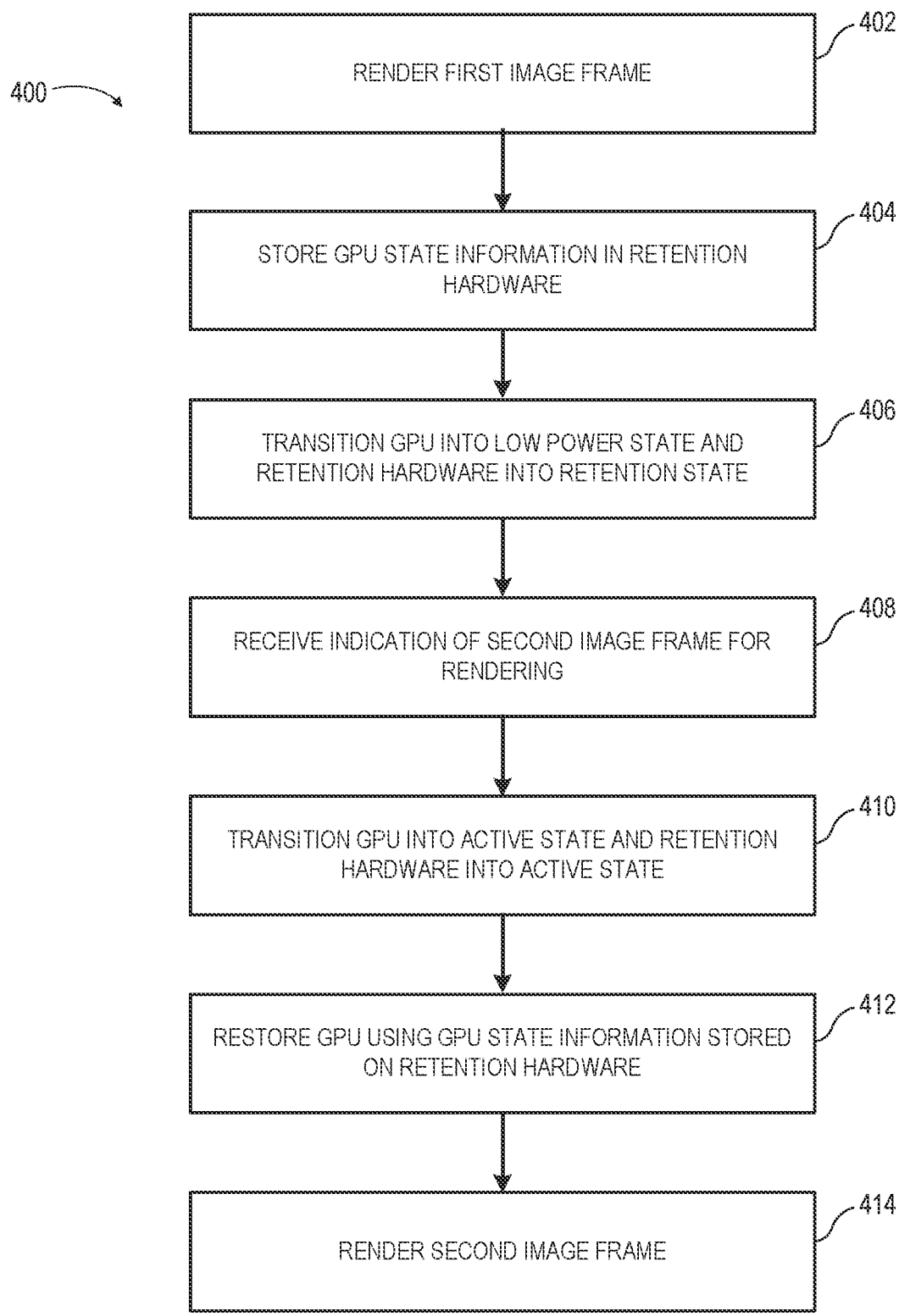
FIG. 4 is a flow diagram illustrating a method for an IFPO operation of a GPU with retention hardware, in accordance with some embodiments.

FIG. 4 is a flow diagram of a method 400 of implementing an IFPO process for a GPU in a processing system, where the IFPO process utilizes retention hardware to store GPU state information while the GPU is in a low-power state. The method 400 is implemented in some embodiments of the processing system 100 shown in FIG. 1.

At block 402, the GPU 102 renders a first image frame.

At block 404, the GPU 102 stores GPU state information 132 (e.g., register settings and microcode) at the retention hardware 130. In some embodiments, the retention hardware 130 includes retention RAMs, while in other embodiments the retention hardware 130 includes retention flip-flops.

At block 406, the GPU 102 transitions from an active state to a low-power state in which components of the GPU 102 (e.g., compute units, microprocessors, caches, controllers, memory modules, and/or the like) are no longer supplied with power. Additionally, the retention hardware 130 transitions into a retention state. In some embodiments, transitioning the retention hardware 130 into the retention state includes switching a power supply voltage supplied to the retention hardware 130 from a main power supply voltage to a secondary power supply voltage, where the secondary power supply voltage is lower than the main power supply voltage. In some embodiments, the secondary power supply voltage is set to a maximum DRV among the DRVs of memory cells of the retention hardware 130. In some embodiments, the GPU 102 instructs or otherwise causes the retention hardware 130 to transition into the retention state.

At block 408, the GPU 102 receives an indication that a second image frame is ready for rendering. In some embodiments, the host CPU 104 sends the indication to the GPU 102 when raw vector data and primitives for the second frame are ready for rendering by the GPU 102, for example.

At block 410, the GPU 102 transitions from the low-power state to the active state (e.g., restoring power to the components mentioned above) and the retention hardware 130 transitions from the retention state to the active state (e.g., switching from the secondary power supply voltage to the main power supply voltage).

At block 412, the GPU 102 is restored using the GPU state information 132 stored on the retention hardware 130 upon transitioning the retention hardware to the active state. In some embodiments, the GPU 102 transitions to the active state by restoring microcode from the retention hardware 130 hardware (e.g., using the RLC of the GPU) and restoring register settings from the retention hardware 130.

At block 414, upon restoration of the GPU 102 using the GPU state information 132, the GPU 102 renders the second image frame.

In some embodiments, the apparatus and techniques described above are implemented in a system including one or more integrated circuit (IC) devices (also referred to as integrated circuit packages or microchips), such as the processing system 100 described above with reference to FIG. 1. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to rendering, by a graphics processing unit (GPU), a first image frame and prior to receiving an indication of a second image frame for rendering:
      storing GPU state information on retention hardware of the GPU,
      transitioning the retention hardware into a retention state, and
      transitioning the GPU into a low-power state; and
   transitioning the GPU into an active state in response to receiving the indication of the second image frame for rendering.

2. The method of claim 1, further comprising:
   receiving the indication of the second image frame for rendering while the GPU is in the low-power state; and
   in response to receiving the indication of the second image frame for rendering, transitioning the retention hardware into an active state.

3. The method of claim 2, further comprising:
   in response to transitioning the retention hardware into the active state, restoring the GPU state information from the retention hardware; and
   in response to restoring the GPU state information from the retention hardware, rendering the second image frame.

4. The method of claim 1, wherein transitioning the retention hardware into the retention state comprises:
   changing a power supply voltage supplied to the retention hardware from a main power supply voltage to a secondary power supply voltage, wherein the secondary power supply voltage is less than the main power supply voltage.

5. The method of claim 4, wherein the retention hardware comprises retention random access memory (RAM) comprising one or more memory cells on which the GPU state information is stored, and wherein the secondary power supply voltage corresponds to a data- state retention voltage (DRV) of a memory cell of the retention RAM having a highest DRV from among the one or more memory cells.

6. The method of claim 4, wherein the retention hardware comprises one or more retention flip-flops on which the GPU state information is stored, and wherein the secondary power supply voltage corresponds to a minimum voltage required for the one or more retention flip-flops to retain the GPU state information.

7. The method of claim 1, wherein the GPU state information comprises microcode for a command processor of the GPU.

8. The method of claim 1, wherein the GPU state information comprises register settings for one or more registers of the GPU.

9. A processing system comprising:
   retention hardware configured to operate in a selected one of an active state and a retention state; and
   a graphics processing unit (GPU) coupled to the retention hardware, wherein the GPU is configured to:
      render a first image frame;
      in response to rendering the first image frame and prior to receiving an indication of a second image frame for rendering:
         store GPU state information of the GPU on retention hardware;
         cause the retention hardware to transition from the active state to the retention state; and
         transition into a low-power state; and
      transition the GPU into an active state in response to receiving the indication of the second image frame for rendering.

10. The processing system of claim 9, wherein the GPU is further configured to:
    received the indication off all the second image frame for rendering while the GPU is in the low-power state; and
    causing the retention hardware to transition from the retention state to the active state in response to receiving the indication of the second image frame for rendering.

11. The processing system of claim 10, wherein the GPU is further configured to:

in response to causing the retention hardware to transition into the active state, restore the GPU state information from the retention hardware; and in response to restoring the GPU state information from the retention hardware, render the second image frame.

12. The processing system of claim 9, wherein, to cause the retention hardware to transition from the active state to the retention state the GPU is configured to:

change a power supply voltage supplied to the retention hardware from a main power supply voltage to a secondary power supply voltage, wherein the secondary power supply voltage is less than the main power supply voltage.

13. The processing system of claim 12, wherein the retention hardware comprises retention random access memory (RAM) comprising one or more memory cells on which the GPU state information is stored, and wherein the secondary power supply voltage corresponds to a data-state retention voltage (DRV) of a memory cell of the retention RAM having a highest DRV from among the one or more memory cells.

14. The processing system of claim 12, wherein the retention hardware comprises one or more retention flip-flops on which the GPU state information is stored, and wherein the secondary power supply voltage corresponds to a minimum voltage required for the one or more retention flip-flops to retain the GPU state information.

15. The processing system of claim 9, wherein the GPU further comprises:

a command processor, wherein the GPU state information comprises microcode for the command processor; and one or more registers, wherein the GPU state information comprises register settings for the one or more registers.

16. A method comprising:

rendering, by a graphics processing unit (GPU), a first image frame;

storing GPU state information on retention hardware of the GPU after rendering the first image frame and prior to receiving an indication of a second image frame for rendering;

transitioning the GPU into a low-power state after rendering the first image frame;

transitioning the GPU into an active state after transitioning the GPU into the low-power state in response to receiving the indication of the second image frame for rendering; and restoring the GPU state information from the retention hardware while transitioning the GPU into the active state.

17. The method of claim 16, further comprising:

causing the retention hardware to transition to a retention state after rendering the first image frame, wherein, in the retention state, the retention hardware retains the GPU state information and read and write operations at the retention hardware are disabled;

receiving the indication of all the second image frame for rendering while the GPU is in the low-power state, wherein transitioning the GPU to the active state is responsive to the indication of the second image frame;

in response to receiving the indication of the second image frame for rendering, causing the retention hardware to transition to exit the retention state; and in response to restoring the GPU state information from the retention hardware, rendering the second image frame.

18. The method of claim 17, wherein causing the retention hardware to transition into the retention state comprises:

causing a power supply voltage supplied to the retention hardware to be changed from a main power supply voltage to a secondary power supply voltage, wherein the secondary power supply voltage is less than the main power supply voltage.

19. The method of claim 18, wherein the retention hardware comprises retention random access memory (RAM) comprising one or more memory cells on which the GPU state information is stored, and wherein the secondary power supply voltage corresponds to a data-state retention voltage (DRV) of a memory cell of the retention RAM having a highest DRV from among the one or more memory cells.

20. The method of claim 18, wherein the retention hardware comprises one or more retention flip-flops on which the GPU state information is stored, and wherein the secondary power supply voltage corresponds to a minimum voltage required for the one or more retention flip-flops to retain the GPU state information.

21. The method of claim 16, wherein the GPU state information comprises microcode for a command processor of the GPU and register settings for one or more registers of the GPU.

* * * * *